United States Patent
Mattson et al.

(10) Patent No.: US 6,960,973 B2
(45) Date of Patent: Nov. 1, 2005

(54) ANGULAR POSITION SENSOR

(75) Inventors: Daniel J. Mattson, Pleasant Prairie, WI (US); Peter D. Joseph, Twin Lakes, WI (US)

(73) Assignee: The Cherry Corporation, Pleasant Prairie, WI (US)

( * ) Notice: Subject to any disclaimer, the term of this patent is extended or adjusted under 35 U.S.C. 154(b) by 32 days.

(21) Appl. No.: 10/464,704

(22) Filed: Jun. 18, 2003

(65) Prior Publication Data

US 2004/0257067 A1 Dec. 23, 2004

(51) Int. Cl.$^7$ .................................................. H01H 9/00
(52) U.S. Cl. ................ 335/207; 324/207.2; 324/207.11
(58) Field of Search ............... 324/200, 207.11–207.15, 324/207.25, 207.2; 335/205–207

(56) References Cited

U.S. PATENT DOCUMENTS

| 4,392,375 | A | 7/1983 | Eguchi et al. |
| 6,137,288 | A | 10/2000 | Luetzow |
| 6,489,761 | B1 | 12/2002 | Schroeder et al. |
| 6,509,734 | B1 | 1/2003 | Luetzow |
| 2001/0026153 | A1 * | 10/2001 | Nakamura et al. ........ 324/207.2 |
| 2002/0121894 | A1 * | 9/2002 | Ooki et al. ............... 324/207.2 |

* cited by examiner

Primary Examiner—Lincoln Donovan
(74) Attorney, Agent, or Firm—Brinks Hofer Gilson & Lione

(57) ABSTRACT

An angular position sensor employs a pair of magnets that are disposed on a rotating cylinder at opposite ends of a diameter of the cylinder. A hall-effect flux sensor is fixed within the cylinder and offset from a line of geometric and magnetic symmetry between the magnets. The offset sensor detects a linear change in flux of the magnets as the magnets rotate with the cylinder over a predetermined angular distance and thereby determines the angular position of the cylinder. The offset of the sensor is adjusted to reduce the sensing error.

19 Claims, 9 Drawing Sheets

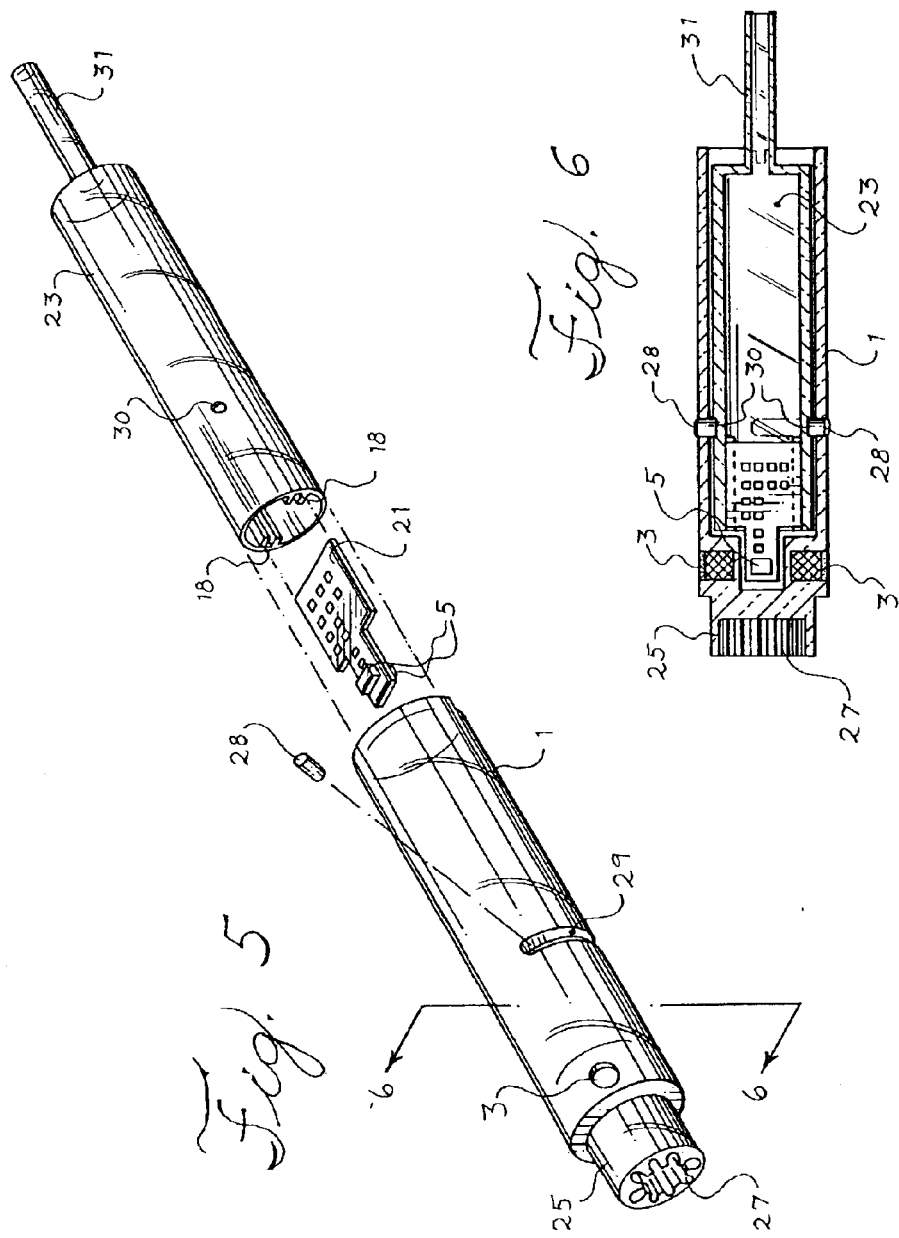

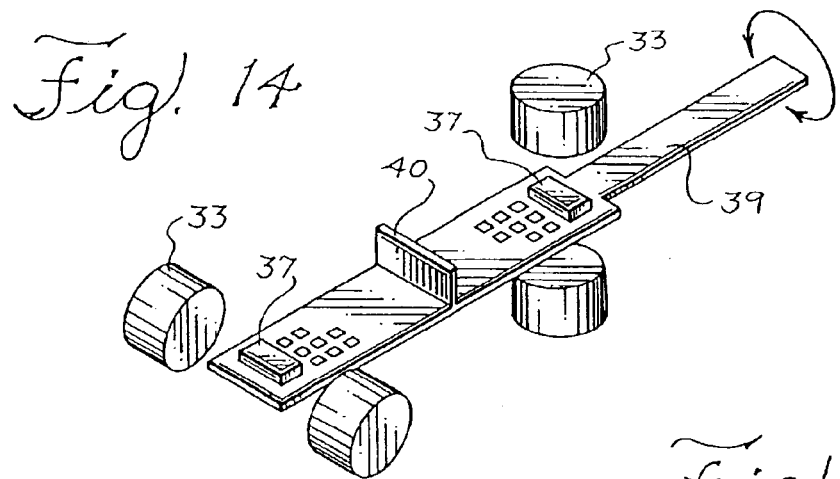
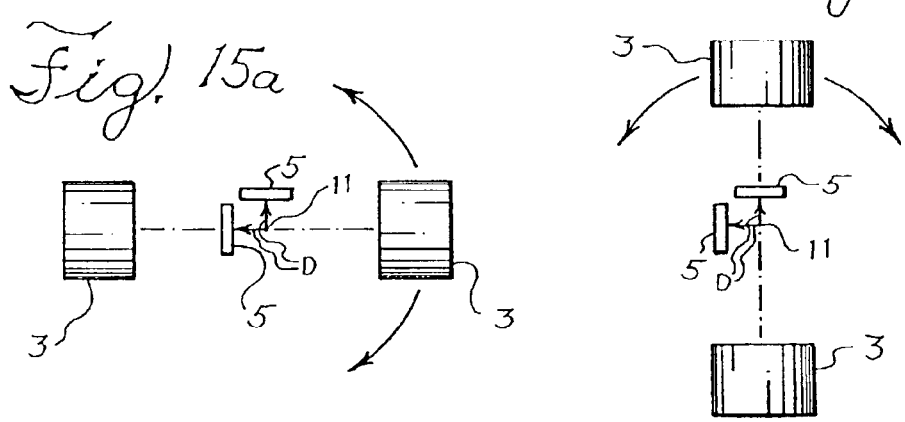
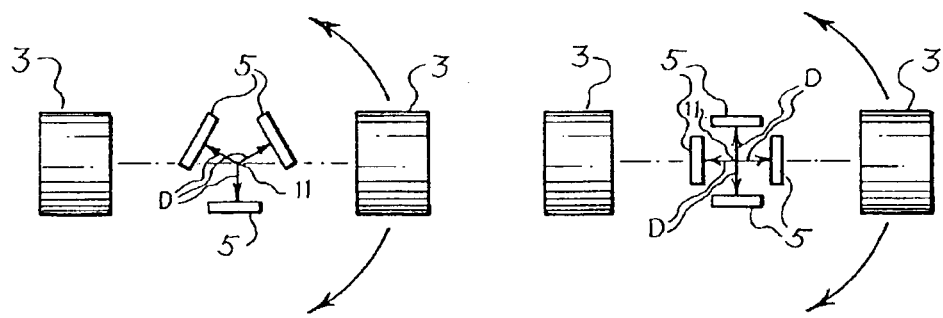

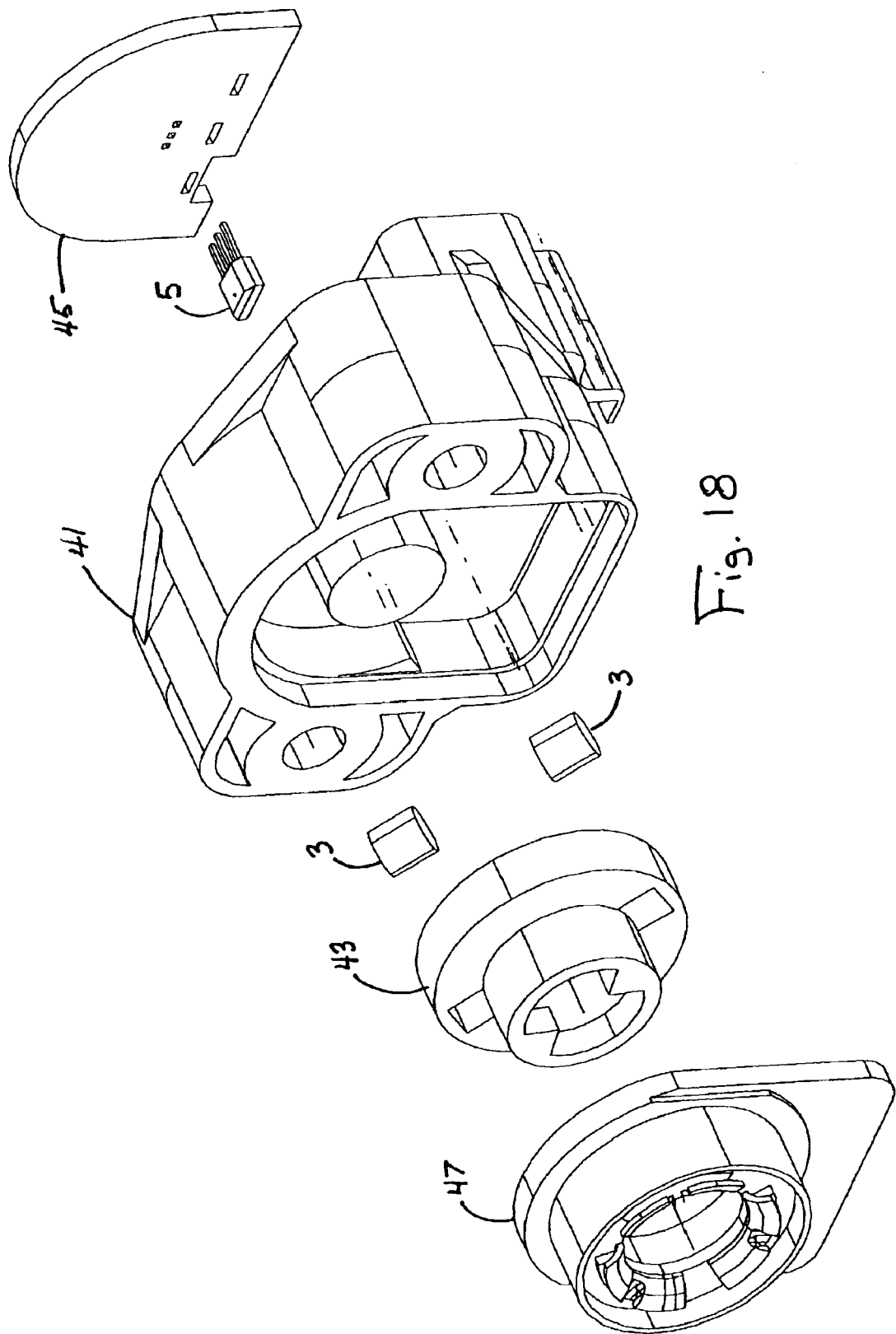

ANGULAR POSITION SENSOR

BACKGROUND OF THE INVENTION

1. Technical Field of the Invention

The invention concerns a magnetic sensor that is used to detect the rotation of an operating component of a machine. More particularly, the invention concerns the use of magnets and an associated magnetosensitive device such as a hall-effect sensor which detects the operational rotation of a throttle, for example as is used to control the engine of a motorcycle or automobile.

2. Description of Related Art

It is known that two opposing magnets may be affixed to a cylinder so that the magnets rotate in opposed orientation as the cylinder rotates on its axis. It is also known that the moving magnetic field of the magnets can be detected by a stationary magnetosensitive detector such as a hall-effect sensor that is disposed within the rotating cylinder and between the opposed magnets. The sensor detects the changing angle of magnetic flux at its upper flux sensitive face as the magnets rotate, and generates a signal which corresponds to the degree of rotation of the cylinder. A known device of this type positioned a flux detector on the geometric and magnetic axis of symmetry of the opposing magnets and detected a sinusoidal change in magnetic flux as the magnets were rotated. This device had an acceptable error for rotation only over a relatively small angular distance of about ±30°.

It would be advantageous to be able to utilize opposing magnets and an associated hall-effect sensor or other magnetosensitive device to detect a linear change in magnetic flux with improved accuracy over a substantially increased range of angular movement. It would also be advantageous to select parameters for the components of such a device in order to optimize the accuracy and linearity of flux detection over a desired increased range of angular movement. An improved angular position sensor of this type would be well suited, for example, to detect the angular movement of the throttle control of a motorcycle or automobile. This improved sensor could also be used to accurately detect the rotation of components for any device.

SUMMARY OF THE INVENTION

The invention concerns an angular position sensor that employs a housing, for example cylindrical in shape, which rotates about its axis. In the system of the invention, at least one pair of magnets is disposed in spaced relation on the housing at opposite ends of an axis of symmetry that is perpendicular to and intersects with the axis of rotation of the cylinder. The magnets are oriented so that their opposite poles face one another over the intervening space within the cylinder. A magnetic flux detector, for example a hall-effect sensor, is disposed at a stationary position within the cylinder and between the magnets, but is offset a predetermined fixed distance from the axis of symmetry of the magnets. This asymmetric positioning of the hall-effect sensor allows the sensor to detect the change in magnetic flux with significant accuracy as the magnets rotate with the cylinder. The flux density of the magnetic field varies nearly linearly in relation to the angular position of the offset sensor over, for example ±75°, and can be detected accurately by the sensor.

The offset sensor and method of the invention for optimizing the detection of linear flux variations can be applied to precisely detect the angular position of the throttle control for a motorcycle or automobile and generate corresponding electrical signals which control the operation of an associated engine. The method and apparatus of the invention can also be used advantageously to detect the angular position of rotating components of other devices. These and other benefits and features of the angular position sensor of the invention will become apparent upon consideration of the following detailed description and accompanying drawings of presently preferred embodiments.

BRIEF DESCRIPTION OF THE DRAWINGS

FIG. 5 is an exploded perspective view of components of an improved angular position sensor according to the invention;

FIG. 6 is a cross-sectional side view of the angular position sensor of FIG. 5;

FIG. 14 is a diagrammatic view of an angular position sensor with spaced magnetic and flux sensor components.

FIG. 15a is a diagrammatic view of a flux sensing apparatus with two sensors.

FIG. 15b is a diagrammatic view of the apparatus of FIG. 15a, with rotated magnets.

FIG. 16 is a diagrammatic view of a flux sensing apparatus with three sensors.

FIG. 17 is a diagrammatic view of a flux sensing apparatus with four sensors.

FIG. 18 is an exploded perspective view of another embodiment of an improved angular position sensor.

DETAILED DESCRIPTION OF THE INVENTION

Figure 1:
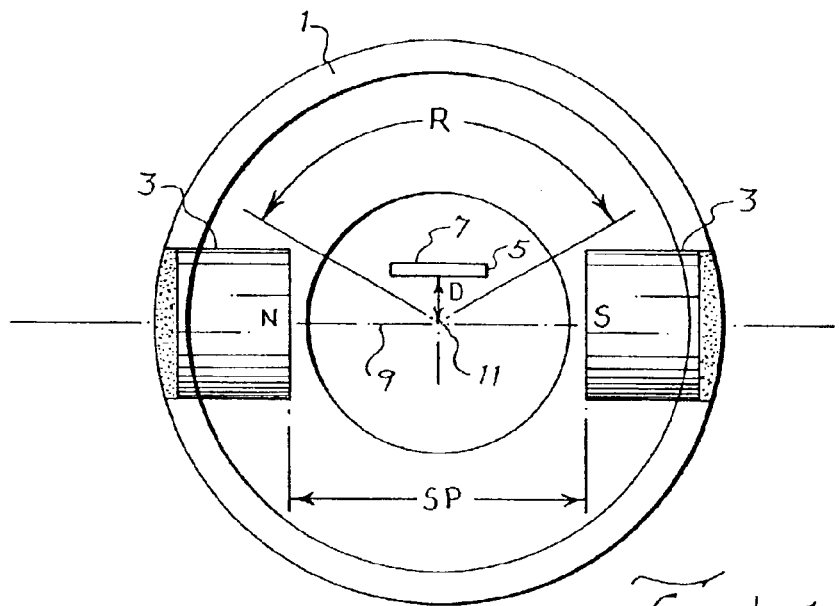
FIG. 1 is a schematic diagram of an improved angular position sensor.

FIG. 1 is a schematic diagram of an improved angular position sensor. As shown in FIG. 1, a cylinder 1 contains a pair of opposed magnets 3 and an offset magnetosensitive detector or flux sensor 5, for example a hall-effect flux sensor or magnetoresistor, which generates electrical signals that correspond to the intensity of magnetic flux detected normal to the top sensing face 7 of the device. Magnetosensitive devices having a different detecting orientation would have correspondingly different offset orientations.

The magnets 3 are affixed to the cylinder 1 with their opposite north (N) and south (S) poles facing one another. An imaginary line 9 of geometric and magnetic symmetry passes through the axis of rotation 11 of the cylinder 1 and connects the faces of the magnets. The line 9 lies on the diameter of a circular cross-section of the cylinder 1. The disposition of the magnets is therefore symmetrical with respect to the line 9 and axis 11 of rotation of the cylinder 1.

The flux sensor 5 is offset from the line 9 by a distance D (shown by the associated arrow of FIG. 1). The distance D by which the flux sensor 5 is offset from the line 9 is selected to optimize the linearity and accuracy of the angular detection of the sensor. It has been found that the ratio of the distance or spacing SP between the magnets on the line 9 and the offset D can be from about 8 to 12 for near optimal operation in many instances. Currently available information also suggests the ratio of the magnet spacing SP to the sensor offset D may also be in the range of about 2 to 16, depending on the physical parameters of components and the desired level of accuracy and linearity for detecting angular movement R. The flux sensor is therefore placed asymmetrically in order to enhance the linearity and accuracy of flux detection at its sensing face 7 as the cylinder 1 rotates, and the ratio SP/D is selected to optimize the linearity and accuracy of the flux detection.

In operation, the cylinder 1 is rotated about its axis 11 and, as it rotates, the magnets 3 also rotate, because they are affixed to the cylinder 1. Although the magnets are shown affixed to the inside surface of the cylinder 1, it should be appreciated that the magnets could also be disposed on the exterior surface of the cylinder 1, so long as the magnetic flux of the magnets enters the space within the cylinder 1 with sufficient intensity to allow the magnetic field to be detected by the offset flux sensor 5 at its sensing face 7.

Figures 2A, 2B:
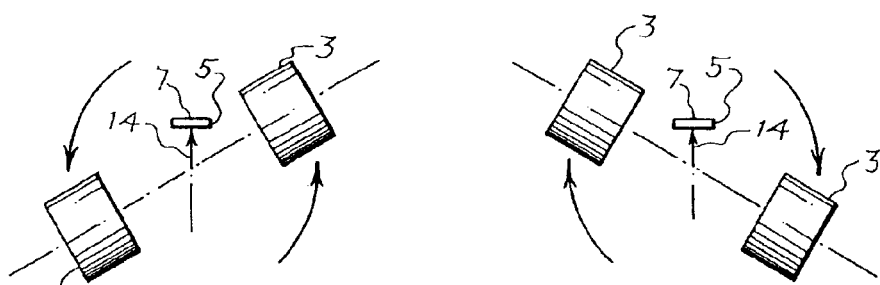
FIGS. 2a–b are schematic drawings of the relative positions of a pair of rotating magnets and a stationary sensor as the magnets rotate in relation to the sensor.
Figures 3A, 3B:
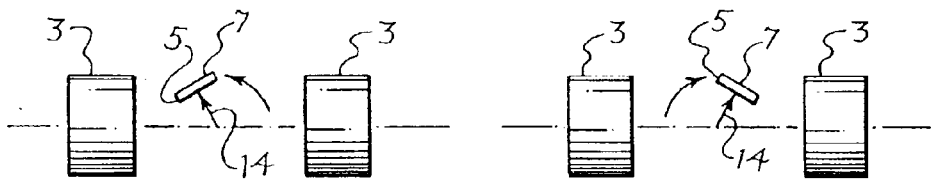
FIGS. 3a–b are schematic drawings of the relative positions of a pair of stationary magnets with a sensor that rotates in relation to the magnets.

FIGS. 2a–b show the rotational movement of the magnets 3 in relation to a stationary flux sensor 5. As the magnets rotate, the flux sensor 5 detects the magnetic flux density over a path which may be an arc with a radius of length D shown by an arrow 14. As the magnets rotate, the stationary flux sensor 5 detects relatively linear changes in the flux density from the magnets 3 normal to the sensing face 7 over a relatively substantial range of angular displacement. FIGS. 3a–b illustrate how the flux sensor could be rotated relative to stationary magnets to achieve the same effect. All that is required is relative movement between the flux sensor 5 and magnets 3.

Figure 4A:
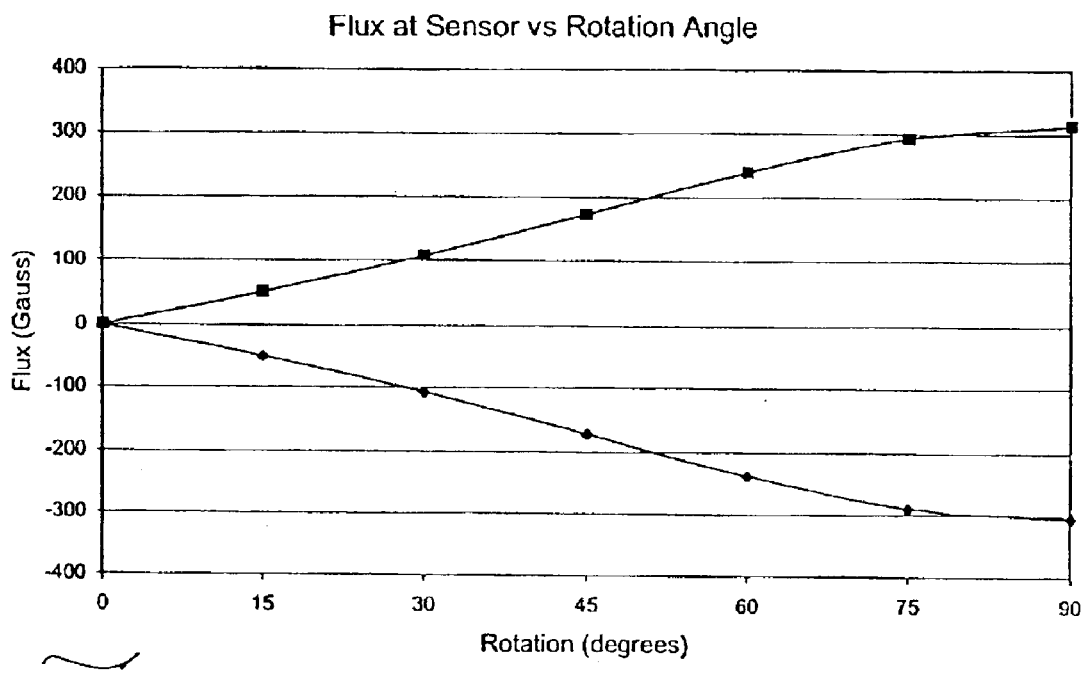
FIG. 4a is a graph showing the linear relationship of detected flux and angular position for a device with an offset flux detector.

FIG. 4a illustrates a graph of the magnitude of flux detected normal to the sensing face 7 of the flux sensor 5 as the cylinder 1 and magnets 3 rotate from a starting position to a displacement of ±90°. As can be seen by reference to FIG. 4a, there is a linear relationship between the detected flux and the angular movement of the cylinder and magnets over a relatively substantial angular distance of about ±75°. This linear relationship results in an electrical output signal from the sensor that is proportional to the angular movement of the cylinder 1 over ±75°. It has been found that the disclosed sensing apparatus and method may be employed to accurately detect the rotational, twisting movement of the cylindrical throttle of a motorcycle and apply electrical signals for corresponding control of the engine of the motorcycle. The apparatus can also detect the angular position of the gas pedal or butterfly valve of the intake manifold of an automobile and thereby control the operation of the engine of the automobile.

Figure 4B:
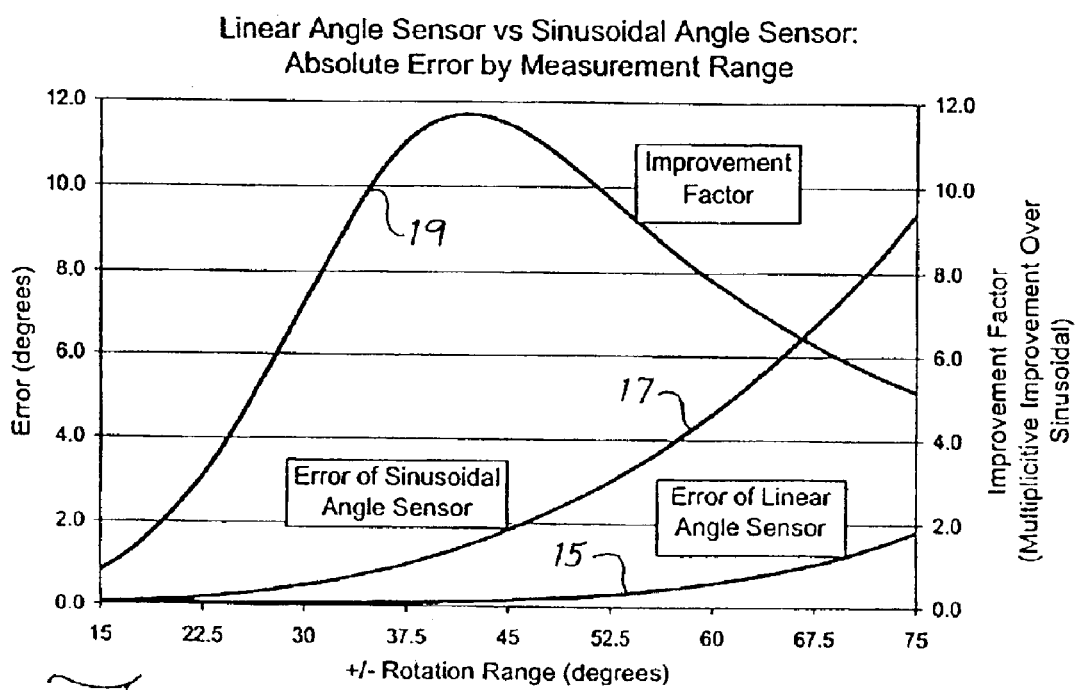
FIG. 4b is a graph of the relative magnitude of detection errors for a known sinusoidal angle sensor and the linear angle sensor of the invention.

FIG. 4b shows a graph which compares the error (in degrees) associated with angle measurements taken by the disclosed apparatus which uses an offset flux sensor, with the error for similar measurements taken by a known apparatus (a sinusoidal angle sensor) which uses a flux sensor that is not offset. As shown in FIG. 4b, the graph 15 of the error for the offset sensor is substantially less than the graph 17 of the error for the same measurements made with a flux sensor disposed on the line of symmetry 9.

The line 19 graphs the multiplier by which the error of the known sinusoidal angular detector exceeds the error of a detector with the offset flux sensor of the invention. As shown in FIG. 4b, the error of the known device exceeds the error of the device of the invention by a factor of more than 10 at a rotation range of ±45°, which is thought to be of widest use for angle sensing applications. It should also be understood that the more accurate apparatus of the invention detects rotation over ±45° with greater linearity than the sinusoidal device which has a linearity limited to a range of about ±30°.

FIG. 5 shows an exploded perspective view of the components of a magnetic angular position detector with offset flux sensors 5. FIG. 6 is a cross-sectional view of this detector which may be used to sense the angular position of the throttle of a motorcycle. As shown in FIGS. 5 and 6, opposing cylindrical magnets 3 are about 0.125 inches in diameter and length and are affixed and potted within recesses in the cylindrical housing 1. These magnets are spaced a distance of about 0.45 inches within the cylindrical housing 1. A circuit board 21 about 0.03 inches thick is carried on molded rails 18 of an internal cylinder 23 which receives the circuit board 21 and which is disposed within the cylindrical housing 1. The rails 18 have end stops which are used to locate the operational position of the circuit board. The circuit board 21 has whatever electronic components are required to process and/or relay the output of the flux sensors 5, which are mounted on opposite sides at the end of the circuit board and disposed in offset relation to the line of symmetry 9 of the magnets 3 when the circuit board and cylinder 23 are fully seated within the cylindrical housing 1. Flux is detected normal to the offset top surfaces of the sensors 5 as the magnets 3 rotate with the cylindrical housing 1. The internal cylinder 23 is held stationary while the cylindrical housing 1 rotates. The noted dimensions of components are provided to disclose an exemplary embodiment. Other dimensions could also be used.

As shown in FIG. 5, the flux sensors 5 may be disposed on the circuit board 21, each with the same magnitude of offset, but on opposite sides of the line of symmetry 9 for the shared magnets 3. The dual sensors could also be disposed next to each other on the same side of the circuit board if the increased space required for this configuration is available. Dual flux sensors may be used to take redundant angular position readings as the magnets rotate. The dual readings may be electronically compared to verify that the angular position sensing mechanism is operating correctly. If a significant variation between the readings of the two sensors is detected, the associated engine throttle could be automatically operated in a safe idle mode to avoid a dangerous operational condition. Of course, if redundancy is not required, the circuit board 21 could support only a single sensor for detecting angular position.

In operation of the device of FIGS. 5 and 6, the cylindrical housing 1 is disposed for rotation within the tube of a handlebar of a motorcycle. An exposed end 25 of the outer cylinder 1 extends from the open end of the handlebar and engages a cylindrical throttle grip (not shown) that is engaged and twisted by the hand to control the engine of a motorcycle. The throttle grip slides over the handlebar and has an integral end cap (not shown) that engages friction prongs 27 within the end 25 to provide a secure friction fit between the cylindrical housing 1 and the cylindrical throttle grip. The cylindrical housing 1 therefore rotates within the handlebar when the throttle grip is twisted and rotated to control the engine.

The allowed degree of rotation of the cylindrical housing 1 is limited by pegs 28 that are inserted and affixed, for example by gluing, in recesses 30 formed in the inner cylinder 23. The pegs 28 extend in sliding engagement with two arcuate slots 29 formed in the cylindrical housing 1. For example, the length of the slots may be dimensioned to provide ±45° of twisting rotation for the throttle grip and cylindrical housing 1.

The inner cylinder 23 is made of a non ferrous or non magnetic material, for example plastic, and the outer cylindrical housing 1 may be made of metal or plastic. The materials of the cylinders must have a suitably low coefficient of friction so that the cylindrical housing 1 rotates on the inner cylinder 23 with no significant interference. The stationary inner cylinder 23 also has a hollow neck portion 31 through which wires (not shown) from the circuit board 17 are routed to electronic controls and associated signals are relayed on to control the engine. An electric clutch (not shown) could be added to hold the throttle grip, and the sensor, in a desired position to act, for example, as a cruise control.

It has been found that magnetically saturated Samarium Cobalt (SmCo) magnets provide the desired operation for detecting angular position. A hall-effect sensor, for example the Micronas HAL 401 provided by the Micronas Semiconductor Company of Zurich, Switzerland, generates relatively accurate and linear electrical signals corresponding to flux changes over about ±75° of rotation. The offset positioning of the flux sensor with respect to two magnets achieves the substantially increased linearity and accuracy of the output of the sensor over a relatively substantial angular displacement of the magnets.

Figure 7:
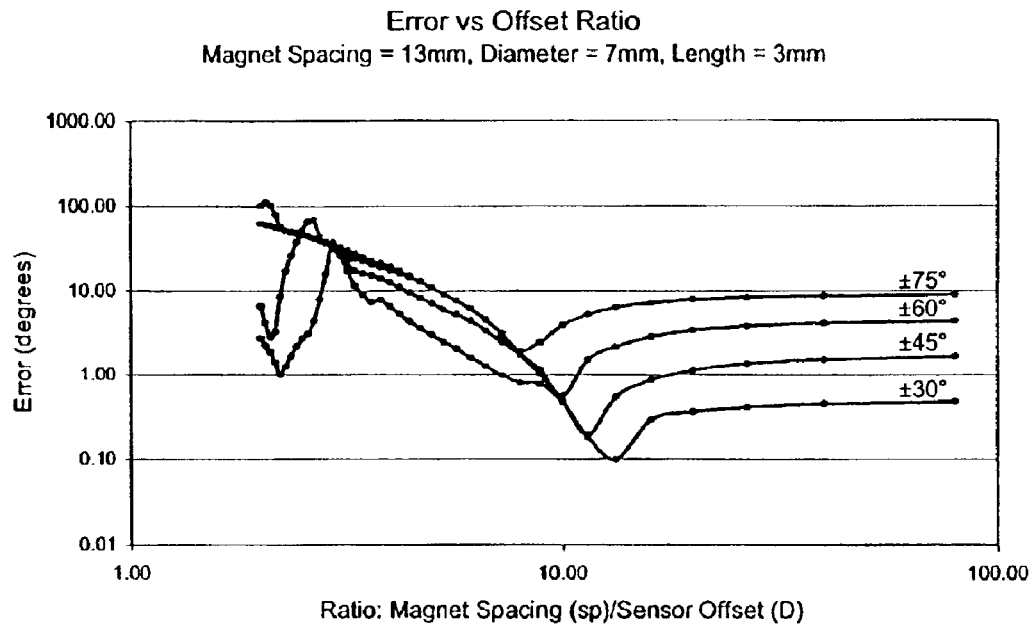
FIG. 7 is a graph showing the rotation sensing error in relation to the ratio of magnet spacing to sensor offset for one embodiment of an angular position sensor.

The accuracy of angular detection for a typical magnet spacing SP of 13 mm, a magnet diameter of 7 mm and a magnet length of 3 mm is shown in FIG. 7. As shown in this figure, for detection of rotation with these components over ±30°, a minimum error of about 0.1° is achieved at an offset ratio (SP/D) of about 20. This error was determined by comparing theoretical angular sensor output angles to exact input angles, then by predicting the amount of error. The reported error is the maximum identified from this theoretical model. If the flux detector is placed at the line of symmetry of the magnets as has been proposed by others, the SP/D ratio increases to a very large number (infinity at a D=0 position) which has a higher associated error that approaches 1.0°, or about ten times the optimal error of 0.1°. If a wider angular measurement is desired (i.e., ±45°, +60° or ±75°), progressively greater sensing errors result. However, these errors can be minimized by adjusting the SP/D ratio. Thus, for a given magnet spacing, diameter and length, the offset of the flux sensor can be selected to minimize the error of angular detection over a selected angular range.

Figure 8:
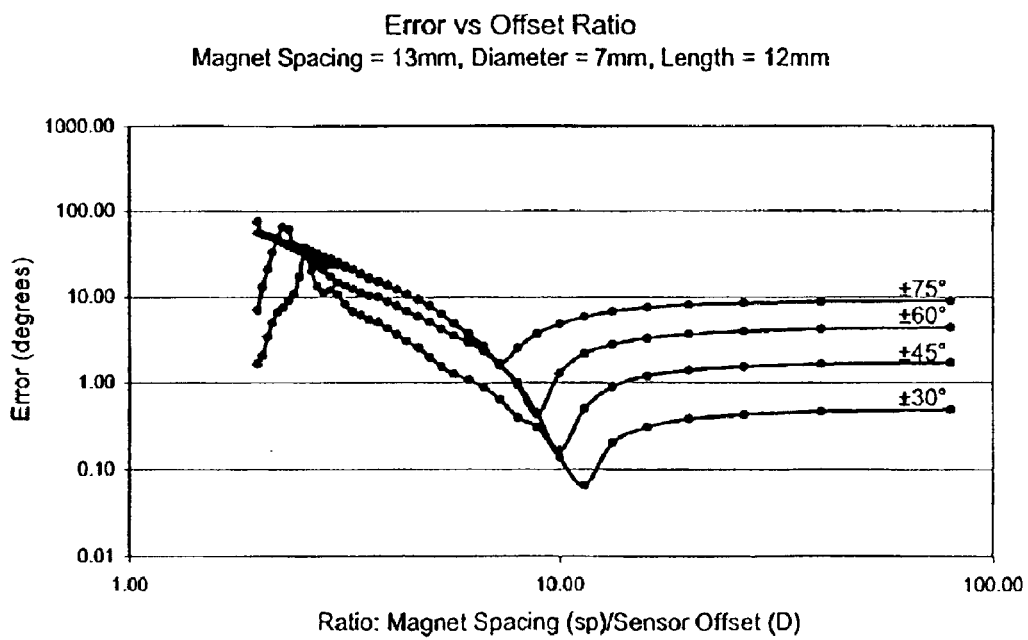
FIG. 8 is a graph showing the rotation sensing error in relation to the ratio of magnet spacing to sensor offset for another embodiment of an angular position sensor.
Figure 9:
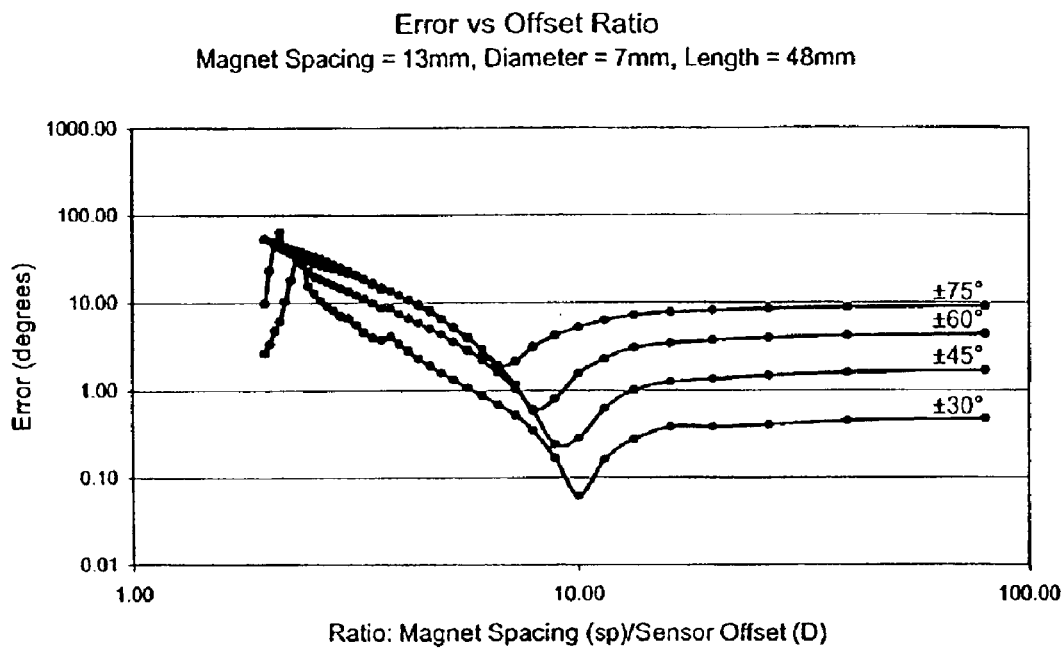
FIG. 9 is a graph showing the rotation sensing error in relation to the ratio of magnet spacing to sensor offset for another embodiment of an angular position sensor.

FIGS. 8 and 9 show error data for devices employing the same magnet spacing and diameter, but increasing the length of the magnets to 12 mm and 48 mm respectively. The graphs of FIGS. 7–9 show that a reduced error can be obtained for the given magnet size and spacing by increasing the length to about 12 mm and that very little additional increase is obtained by increasing the length to about 48 mm. The graphs of FIGS. 7–9 demonstrate an analytical method that may be used to optimize the performance of an angular position detector with an offset flux sensor.

This method for deriving an angle sensor which produces an accurate and linear measurement within specified angular limits, can be summarized as follows:

1. The magnetic circuit is modeled, for example, by using Ansoft Maxwell 3D Magnetostatics Software version 9.0. The modeling process requires creating a magnet geometry, assigning material properties and magnetic orientation, solving the model, and post-processing the data by extracting magnetic field values along a variety of curves representing possible sensor positions.
2. The sensor output is calculated and compared to a perfectly linear ideal sensor using, for example, MS Excel 97. The calculation is achieved by importing field values into the data processing software and calculating sensor responses in view of the vector nature of the calculated magnetic field and the vector nature of the magnet sensor that is used. The sensor values are then scaled and offset for the best fit to a linear ideal curve for a given rotational range. The scale and offset are kept constant for all analyzed angular positions for a given sensor offset D and angular range combination. The calculated system output is then compared to a linear output and the greatest absolute error is recorded and graphed.
3. A desired output is selected by reviewing various sensor output graphs, weighing linearity as well as tolerance, application specifications, geometrical constraints, and choosing the desired sensor offset, given the spacing, diameter and length of the magnets in the magnetic circuit.

Figure 10:
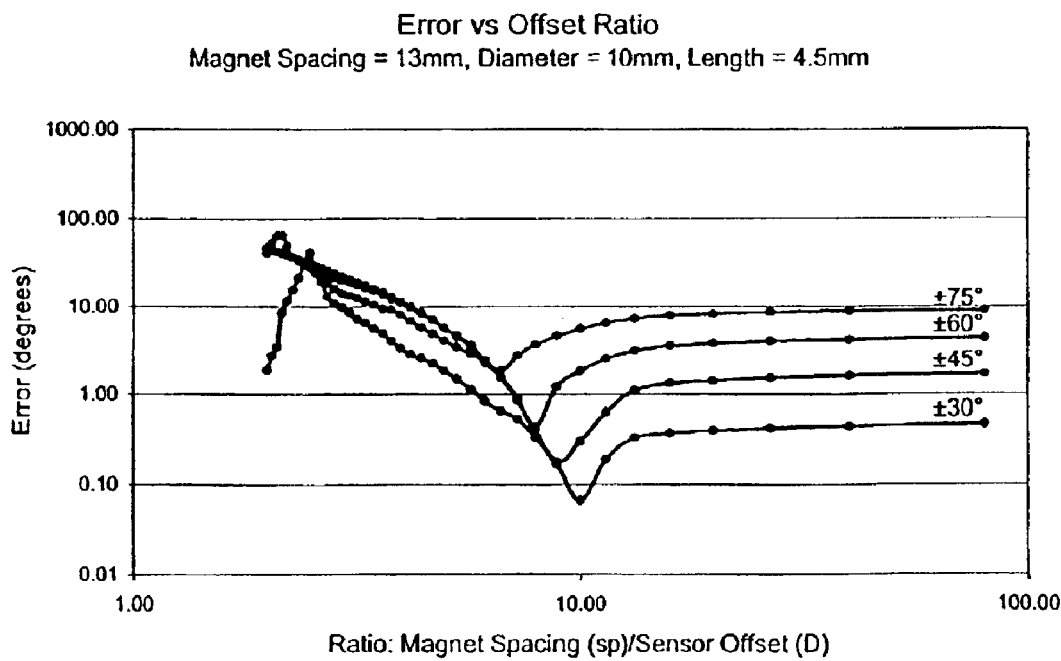
FIG. 10 is a graph showing the rotation sensing error in relation to the ratio of magnet spacing to sensor offset for another embodiment of an angular position sensor.
Figure 11:
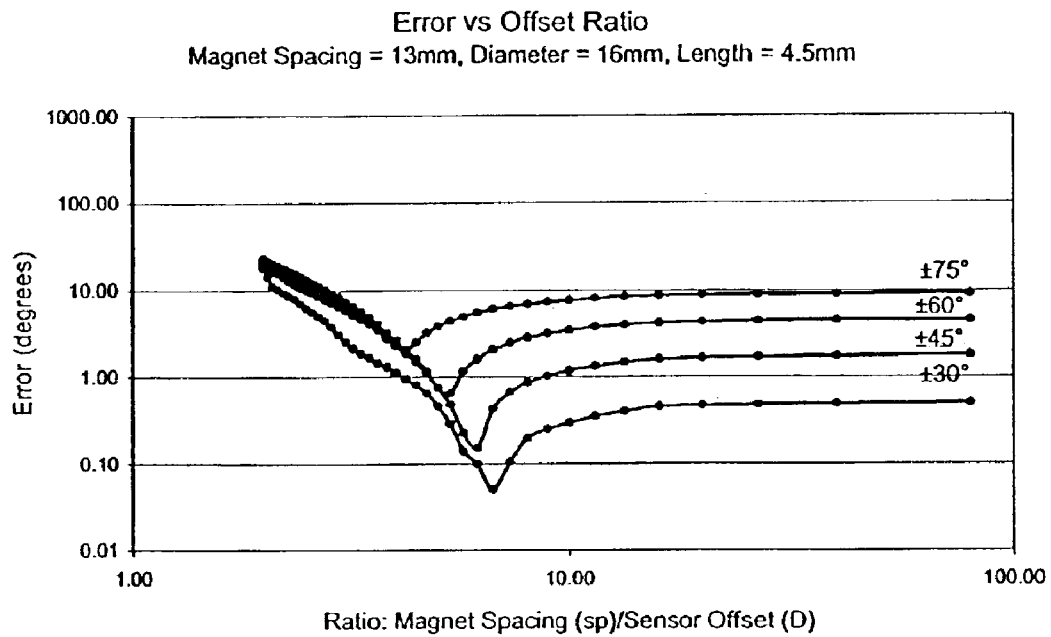
FIG. 11 is a graph showing the rotation sensing error in relation to the ratio of magnet spacing to sensor offset for another embodiment of an angular position sensor.
Figure 12:
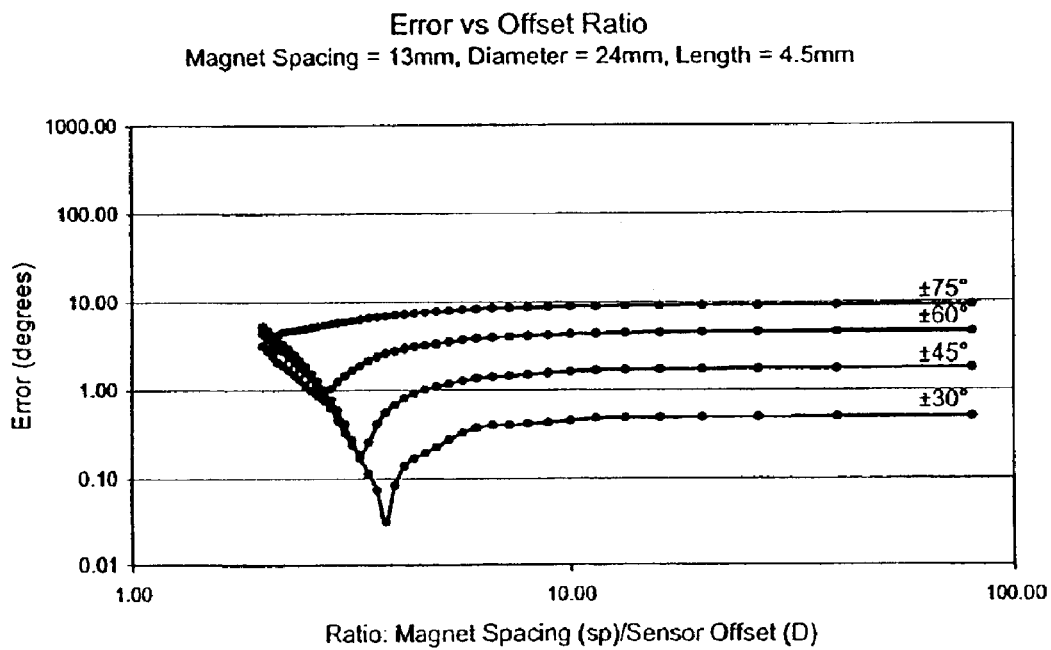
FIG. 12 is a graph showing the rotation sensing error in relation to the ratio of magnet spacing to sensor offset for another embodiment of an angular position sensor.
Figure 13:
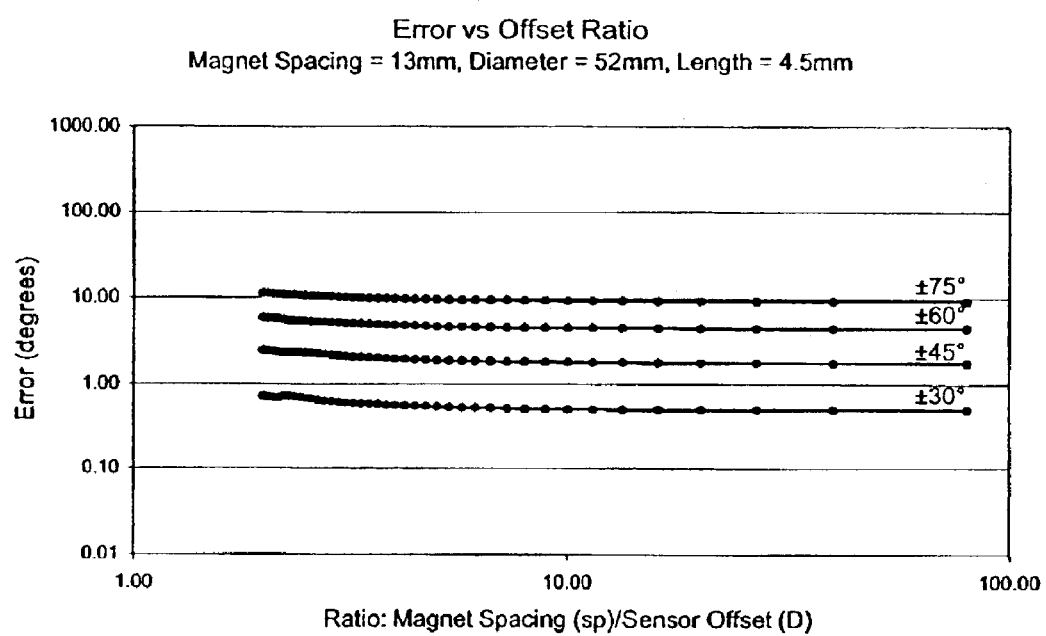
FIG. 13 is a graph showing the rotation sensing error in relation to the ratio of magnet spacing to sensor offset for another embodiment of an angular position sensor.

FIGS. 10–13 further demonstrate the results of the analytical method whereby optimal parameters for components are selected. FIG. 10 shows the calculated error for a detector having a 13 mm magnet spacing, a 10 mm magnet diameter, and a magnet length of 4.5 mm. FIGS. 11–13 show the analytical result achieved by varying the diameter of the magnet to 16 mm, 24 mm, and 52 mm respectively. As shown in FIG. 12, a minimum error is achieved with 24 mm magnet diameters. However, smaller magnets could be used, as shown in FIGS. 10 and 11, with very little increase in error, if different SP/D ratios are also used.

If a relatively small size for the apparatus and maximum accuracy and linearity is desired, the configuration of FIG. 12 would be selected. The maximum error reduction of FIG. 12 is achieved with a relatively small SP/D ratio of about 5. Since the magnet spacing SP is the same for FIGS. 10–13, the reduced error of FIG. 12 is achieved only by increasing the offset distance D of the flux sensor, which should not affect the size of the device. The 52 mm diameter of FIG. 13 would not be selected, because there is no well-defined single minimum error. Also, errors for FIG. 13 exceed the minimums achieved by the components for FIGS. 10–12.

FIGS. 10–13 also demonstrate that with the given component dimensions, the measurement error decreases as the diameter of the magnets increases from 10 mm to 24 mm and the SP/D ratios decrease, indicating increasing offsets. Increasing the diameter of the magnets beyond 24 mm in this data set results in increases in sensing errors and is therefore not desirable if an optimum sensing operation is required. It should now be understood that the analytic method of the invention can be used to optimize the operation of any angular position detector which employs an offset flux sensor. Also, the invention is not limited to adjusting only the parameters of magnet diameter, length and spacing. Other parameters could be adjusted and analyzed in the disclosed manner to optimize angular measurements. For example, the effect of moving the flux sensor away from relative rotation about a point on the rotational axis of the cylinder could be determined in order to optimize performance. Of course, any other change in physical parameters could also be evaluated.

FIG. 14 illustrates an apparatus that will accurately sense angular position over an increased range. In this embodiment, two pairs 33 of magnets are used, each with its own flux detector 37. As the support 39 is rotated, one pair of magnets and the associated sensor detect the angular position over a predetermined optimum angular range. When this range is exceeded, the second magnet pair and sensor are used to accurately detect angular position over the following angular range. Known electronic gating circuits can be used to alternatively select each magnet pair and its sensor for detecting angular position, while turning off or ignoring the data generated by the other magnet pair. Also, the magnet pairs are isolated from each other either by the distance separating them or by a flux shield 40. In this way, accurate and linear measurements may be taken over a range in excess of ±90°, perhaps extending to ±180°. Of course, these improved results could also be obtained by rotating the magnets 3, for example with a cylindrical housing 1 as previously disclosed, and maintaining the support 39 stationary.

FIG. 15a illustrates another embodiment of a device for detecting angular movement over an extended range. This device uses two flux sensors 5 arranged at a right angle to detect different ranges of angular position. As shown in FIG. 15a, one flux sensor will detect movement of the magnets in the indicated orientation. FIG. 15b shows the orientation of the magnets for detecting movement with the other flux sensor. The flux sensor may be offset by the same amount D, or the offsets could be varied if necessary to improve operational results.

FIG. 16 illustrates another embodiment which uses three flux sensors arranged in a triangle at offsets D to detect rotation over an extended range. FIG. 17 illustrates an embodiment which uses four flux sensors at offsets D to detect rotation over an extended range with two pairs of sensors for redundant sensing. The opposite sensor components of each pair of sensors detect redundant angular positions of the same magnitude but opposite relative orientation, a 180° direction change of the magnetic field, and so the sensor readings for the components of the sensor pair are linear in the same angular range. As previously noted, the redundant readings can be used to add reliability or diagnostic capabilities. Also, different offsets could be used for sensors within a group. The embodiments of FIGS. 16 and 17 may require electronic gating to read data from each successively actuated flux sensor or pair of flux sensors in response to relative angular movement between the sensors and their magnets.

FIG. 18 shows an exploded perspective view of components of an angular position sensor for controlling the engine of an automobile. A sensor housing 41 supports a rotor 43 that retains two spaced opposed magnets 3 in the manner previously described. A flux sensor 5, for example a hall-effect sensor, engages a printed circuit board 45 that is pressed against and potted to the rear of the housing 41. The flux sensor 5 is held in place between the magnets 3 and offset from the axis of symmetry of the magnets, as previously described. A front cover 47 is engaged with the housing 41 to retain the magnet rotor assembly.

The rotor 43 is engaged for rotation with a conventional butterfly valve (not shown) which is disposed in the throttle body of the intake manifold of an automobile engine (not shown). In operation, when a gas pedal (not shown) of the automobile is operated, it is mechanically linked to the butterfly valve, so that movement of the gas pedal causes corresponding movement of the butterfly valve in a conventional manner. The rotor 43 rotates approximately ±45° with the butterfly valve and the flux sensor 5 generates an electrical signal that corresponds to the angular position of the butterfly valve and the associated operational position of the gas pedal. This signal is applied as an input to a conventional engine control computer which uses the angular position information of the flux sensor to control the automobile engine in a conventional manner.

In an alternative embodiment, angular position sensors having the features previously described could be connected to both the gas pedal and butterfly valve of the intake manifold. The gas pedal sensor could then either detect the angular position of the gas pedal and transmit control signals to rotate the butterfly valve to a corresponding position, or it could only monitor the angular position of the gas pedal which could remain mechanically linked to the butterfly valve. In either case, the sensed angular position of the gas pedal could be compared with the sensed angular position of the butterfly valve in order to verify proper and synchronous operation of these components. These data would be input to the engine control computer. If the sensed angular positions of the gas pedal and butterfly valve agree with one another, the data will be used to control the normal function of the engine. If the sensed positions do not agree, the engine could be operated in an idle condition as a safety precaution.

Although angular position sensors have been disclosed for use in detecting the angular position of the throttle of a motorcycle or automobile, it should be understood that the sensors can be used to detect the rotational position of any apparatus. Also, although embodiments have been described with respect to movement of a cylindrical housing, it should be appreciated that a housing of any desired shape could be used, so long as the associated flux sensor is positioned at a desirable offset. Moreover, although cylindrical magnets have been shown in the disclosed embodiments and are preferred in manufacturing, magnets of any shape, for example square, rectangular or L-shapes could be used and even opposing magnets of different shapes could be used. Also, relative movement between a flux sensor and a pair of magnets could be achieved over any desired path. However, paths defined as arcs concentric about the magnetic and geometric line of symmetry 9 and axis of rotation 11 are preferred. Of course, the disclosed analytic method of the invention could be used to evaluate the efficacy of any selected paths, shapes of magnets, or any other changes in the components or orientation or size of components for the angular position sensing device.

Variations and modifications of the disclosed embodiments may therefore be made without departing from the scope of the invention. The aforementioned description is therefore intended to be illustrative rather than limiting, and it should be understood that the following claims and their equivalents set forth the scope of the invention.

We claim:

1. An angular position sensor, comprising:
   at least one pair of magnets disposed in spaced relation and defining a line of geometric and magnetic symmetry between them, said magnets having opposite facing poles; and
   at least one magnetic flux sensor having a magnetic field-sensing face disposed between said magnets and spaced a predetermined offset distance away from said line of symmetry, such that the sensing face does not intersect the line of symmetry, whereby the sensor senses a relatively linear change in magnetic flux in response to relative angular movement between said pair of magnets and the sensor.

2. The sensor of claim 1, wherein said predetermined offset distance is from ½ to 1/16 of the distance between said magnets along said line of symmetry.

3. The sensor of claim 1, wherein said magnets are cylindrical in shape.

4. The sensor of claim 1, wherein said magnets are cylindrical in shape and catch has a length the same as its diameter.

5. The sensor of claim 1, including a cylindrical support for mounting the magnets for rotation relative to a stationary flux sensor.

6. The sensor of claim 5, wherein said support rotates to enable operation of the engine of a motorcycle or automobile.

7. The sensor of claim 1, wherein said magnetic flux sensor is a hall-effect sensor.

8. The sensor of claim 1, including two or more pairs of magnets, each with at least one associated magnetic flux sensor for sensing angular positions over a preselected extended range of rotation.

9. The sensor of claim 1, including two or more magnetic flux sensors oriented to sense angular positions over an extended range of rotation.

10. The sensor of claim 1, including two or more flux sensors for providing redundant sensing of said magnetic flux.

11. An electronic throttle position sensor, comprising:
    a nonmagnetic cylindrical throttle control for rotationally twisting on its axis to control the acceleration of a motorcycle;
    at least one pair of magnets disposed in spaced relation within said cylindrical throttle control at opposite ends of a line perpendicular to and intersecting said axis, said magnets having opposite facing poles and defining a line of geometric and magnetic symmetry between them; and
    at least one flux sensor having a magnetic field-sensing face disposed between said magnets and spaced a predetermined offset distance away from said line of symmetry, whereby the flux sensor senses a relatively linear change in magnetic flux as said cylindrical throttle control and magnets rotate relative to the sensor.

12. The sensor of claim 11, including two or more pairs of magnets, each with at least one associated flux sensor for sensing angular position over a preselected extended range of rotation of said throttle control.

13. The sensor of claim 11, including two or more magnetic flux sensors oriented to sense angular position over an extended range of relation.

14. The sensor of claim 11, including two or more flux sensors for providing redundant sensing of said magnetic flux.

15. A method for detecting angular position, comprising the steps of:
    rotating a cylindrical housing about its axis;
    affixing a pair of magnets on said cylindrical housing with opposite facing poles and spaced at opposite ends of a diameter of said housing;
    mounting at least one magnetic flux sensor within the cylindrical housing and offset a predetermined fixed distance from a line of symmetry between said magnets; and detecting a linear change in magnetic flux as said cylindrical housing and magnets rotate relative to the magnetic flux sensor through a predetermined angle about said axis.

16. The method of claim 15, including the step of using two or more pairs of magnets and associated flux sensors; and detecting linear changes in magnetic flux over different predetermined angular distances for each said pair.

17. The method of claim 15, further including the step of using a pair of facing magnets and two or more magnetic flux sensors oriented to increase the angular distance over which linear changes in magnetic flux are detected.

18. The method of claim 15, further including the step of using a hall-effect device us the flux sensor.

19. The method of claim 15, further including the step of using two or more flux sensors for providing redundant sensing of said magnetic flux.

* * * * *

UNITED STATES PATENT AND TRADEMARK OFFICE
CERTIFICATE OF CORRECTION

PATENT NO. : 6,960,973 B2  
APPLICATION NO. : 10/464704  
DATED : November 1, 2005  
INVENTOR(S) : Daniel J. Mattson et al.

It is certified that error appears in the above-identified patent and that said Letters Patent is hereby corrected as shown below:

In the Claims

Column 9, in claim 4, line 25, after "cylindrical in shape and" delete "catch" and substitute --each-- in its place.

Column 10, in claim 13, line 18, after "an extended range of" delete "relation" and substitute --rotation-- in its place.

Signed and Sealed this

Twelfth Day of December, 2006

JON W. DUDAS  
*Director of the United States Patent and Trademark Office*